United States Patent
Cassani (10) Patent No.: US 6,309,206 B1
(45) Date of Patent: Oct. 30, 2001

(54) PLANT FOR FORMING CERAMIC TILES, INCLUDING THOSE OF LARGE DIMENSIONS, BY MEANS OF A PARTIALLY ISOSTATIC MOLDS

(75) Inventor: Giuseppe Cassani, Imola (IT)

(73) Assignee: Sacmi-Cooperativa Meccanici Imola-Soc Coop. A.R.L., Imola (IT)

(*) Notice: Subject to any disclaimer, the term of this patent is extended or adjusted under 35 U.S.C. 154(b) by 0 days.

(21) Appl. No.: 09/449,496

(22) Filed: Nov. 29, 1999

Related U.S. Application Data (62) Division of application No. 09/124,069, filed on Jul. 29, 1998, now Pat. No. 6,030,576.

(30) Foreign Application Priority Data

Aug. 1, 1997 (IT) ............................................. RE97A0059

(51) Int. Cl.$^7$ .................................................. B28B 1/087
(52) U.S. Cl. ........................ 425/419; 425/421; 425/432
(58) Field of Search .............................. 425/425, 405.1, 425/432, 421, 419

(56) References Cited

U.S. PATENT DOCUMENTS

| | | | |
|---|---|---|---|
| 2,618,833 | 11/1952 | Adams | 425/167 |
| 3,671,618 | 6/1972 | Huber et al. | 264/120 |
| 3,717,693 | 2/1973 | Kohl et al. | 264/109 |
| 3,767,351 | * 10/1973 | Blaser | 425/432 |
| 3,795,464 | * 3/1974 | Backman et al. | 417/274 |
| 3,813,527 | * 5/1974 | Langston | 235/151.34 |
| 3,816,052 | * 6/1974 | Schoppee et al. | 425/406 |
| 4,418,671 | * 12/1983 | Kelso et al. | 123/450 |
| 4,561,251 | * 12/1985 | Moret et al. | 60/537 |
| 4,649,818 | * 3/1987 | Switall et al. | 101/147 |
| 4,666,389 | * 5/1987 | Relis et al. | 425/78 |
| 4,725,220 | * 2/1988 | Percinel et al. | 425/406 |
| 4,726,221 | * 2/1988 | Tavlarides et al. | 73/61.1 R |
| 5,198,240 | * 3/1993 | Baxi | 425/145 |
| 5,242,641 | * 9/1993 | Horner et al. | 264/104 |
| 5,330,346 | 7/1994 | Scardovi | 425/405.1 |
| 5,401,153 | * 3/1995 | Katagiri et al. | 425/78 |
| 5,472,334 | * 12/1995 | Takahashi | 425/554 |
| 5,478,225 | * 12/1995 | Takeuchi et al. | 425/78 |
| 5,494,426 | * 2/1996 | Ibar | 425/3 |
| 5,498,147 | * 3/1996 | Katagiri et al. | 425/78 |
| 5,551,856 | * 9/1996 | Katagiri | 425/78 |
| 5,599,566 | 2/1997 | Casolari | 425/405.1 |
| 5,786,003 | 7/1998 | Debbia | 425/405.1 |

FOREIGN PATENT DOCUMENTS

| | | |
|---|---|---|
| 4320203A | 12/1994 | (DE) . |
| 0556163 | 8/1993 | (EP) . |
| 2662381A | 11/1991 | (FR) . |
| 1257658B | 2/1996 | (IT) . |

* cited by examiner

*Primary Examiner*—Nam Nguyen
*Assistant Examiner*—Emmanuel S. Luk (57) ABSTRACT

A plant for forming ceramic tiles by means of a partially isostatic mold, comprising the following stages: loading the ceramic powder to be pressed into the mold cavity; exerting a uniform pressure on the entire surface of the ceramic powder present in the mold cavity; releasing the pressure and partially opening the mold to facilitate powder deaeration; exerting pressure on a first portion of the surface of the powder contained in the mold cavity; exerting pressure on a second portion of the surface of the powder contained in the mold cavity, while simultaneously nullifying the pressure on said first surface portion of the powder contained in the mold cavity; and alternating the exertion of pressure on said first and on said second portion alternately.

7 Claims, 8 Drawing Sheets

PLANT FOR FORMING CERAMIC TILES, INCLUDING THOSE OF LARGE DIMENSIONS, BY MEANS OF A PARTIALLY ISOSTATIC MOLDS

This application is a divisional of application Ser. No. 09/124,069, filed on Jul. 29 1998, now U.S. Pat. No. 6,030,576 the entire contents of which are hereby incorporated by reference.

BACKGROUND OF THE INVENTION

Ceramic tiles are commonly formed by pressing material in powder form, of between 1% and 10% moisture content, within a mould.

This forming method is commonly known as dry forming.

The soft material is loaded into the mould by known means.

After the mould has been closed by punches operated by pressing members, the powder undergoes initial light pressing, with consequent volume reduction, facilitating powder deaeration.

The initial light pressing, also known as a first pressing, is followed by the deaeration stage, during which pressing is interrupted and the mould is sometimes reopened to allow the air to escape.

This is followed by the main pressing to a pressure of about 400 $kg/cm^2$, which ensures perfect powder compaction.

The main pressing generally takes place in several successive steps, with the powder in the mould cavity being subjected to increasing compacting pressure up to the maximum compacting pressure permitted by the press capacity.

The thrust exerted by the upper cross-member of the press is distributed over the total surface of the tiles pressed during each cycle.

The largest currently available presses have a capacity (pressing force) of 4000 tonnes, and during each cycle are able to press a surface area of not exceeding 10,000 $cm^2$. Thus, for example, they can operate a die having three impressions of 54 cm×54 cm.

Tiles of large and ever larger dimensions, having sides exceeding one meter, have not been able to be formed so far by known dry processes because the capacity (pressing force) of the press required to compact the pressure would involves a structure of such dimensions as to be difficult to construct.

Large-dimension tiles having sides of the order of one meter or more are currently manufactured either by extrusion processes or by wet forming processes within hygroscopic moulds similar to those used for sanitary appliances.

Apart from the low cost effectiveness of such processes, the subsequent drying and high-temperature firing of the material creates important problems due to the excessive or poorly distributed moisture contained in the material.

SUMMARY OF THE INVENTION

The object of the present invention is to achieve dry-forming of ceramic tiles by powder compaction which are particularly but not exclusively of large dimensions, having for example a side dimension of the order of 100 cm, using currently available pressing forces, ie presses of currently available capacity.

In particular the method of the present invention enables very high compacting pressures to be obtained with pressing forces which are not in themselves high.

The method of the present invention comprises dividing the tile surface into two or more portions, preferably of equal surface area, and pressing these portions not simultaneously, but one at a time in succession.

It is immediately apparent that by dividing the surface to be pressed into two portions having the same area, the press capacity is halved.

To implement the method the mould punch must itself be divided into adjacent portions, preferably having the same surface area.

For example such punch portions can conveniently be concentric.

The pressing cycle according to the present invention comprises the following operations.

The powder is loaded into the mould in a conventional manner, i.e., having expelled the tile the movable carriage grid carries the powder into the mould die.

A cross-member carrying an upper punch divided into portions is then lowered to close the mould. An initial light compaction, or first pressing, follows.

The first pressing can be done by moving the various (for example two) portions of the punch as if the punch were in one piece. This is because the compacting pressure of the first pressing multiplied by the total tile area certainly does not exceed the pressing force which can be exerted by the press.

Considering a punch divided into two portions of equal surface area, as the maximum pressing force exertable by the press is achieved by pressing simultaneously with the two punch portions, part of the pressing force is applied in succession, for example firstly to a first punch portion, and then to a second punch portion, applying increments of force until the entire press, pressing force is applied firstly to one portion and then to the other.

The entire press force can also be applied from the beginning, firstly to one punch portion and then to the other.

The divided punch can be the upper punch or the lower punch, or a combination of both.

To obtain a degree of powder compaction which is as homogeneous as possible, according to the present invention, at least one of the two portions into which the punch is divided operates isostatically, as will be apparent hereinafter.

With presses having a capacity of up to 4000 tons compacting pressures of up to 500 bar can be achieved on the powder in the mould cavity, even for large-dimension tiles.

BRIEF DESCRIPTION OF THE DRAWINGS

The merits and the constructional and operational characteristics of the present invention will be more apparent from the description given hereinafter with reference to the accompanying drawings, which show three preferred embodiments thereof by way of non-limiting example.

DETAILED DESCRIPTION OF THE INVENTION

FIGS. 1 to 6 show the main hydraulic press cylinder 1 within which there slides a piston 2. Attached to a rod 3 to which the movable cross-member 4 is fixed.

The movable cross-member 4 carries a punch 5 comprising a chamber 51 within which a lattice 52 defines a plurality of cells 53.

An elastic membrane 54 is securely fixed to the edge of the lattice and closes the cells 53, which mutually intercommunicate via the branches 152 of a conduit 151 which is connected via a distributor valve 15 to a pressurized oil source.

Below the punch 5 there is a mould 10 comprising a die 101 and a movable base 102, both supported by the press bed 11.

The hydraulic cylinder 1 is connected above and below the piston 2 to a pressurized oil source and to the outside respectively, and vice versa, by the distributor valve 12 and the pipes 121 and 122.

Between the pressurized oil source 13 and the distributor valve 12 there is provided a maximum pressure valve 14.

After the soft material has been loaded into the cavity of the mould 10 the press cross-member is lowered until the punch 5 enters the mould cavity. During this first pressing stage the oil contained in the cells maintains the membrane 54 flat, the distributor valve 15 being in the condition shown in FIG. 1.

Figure 1:
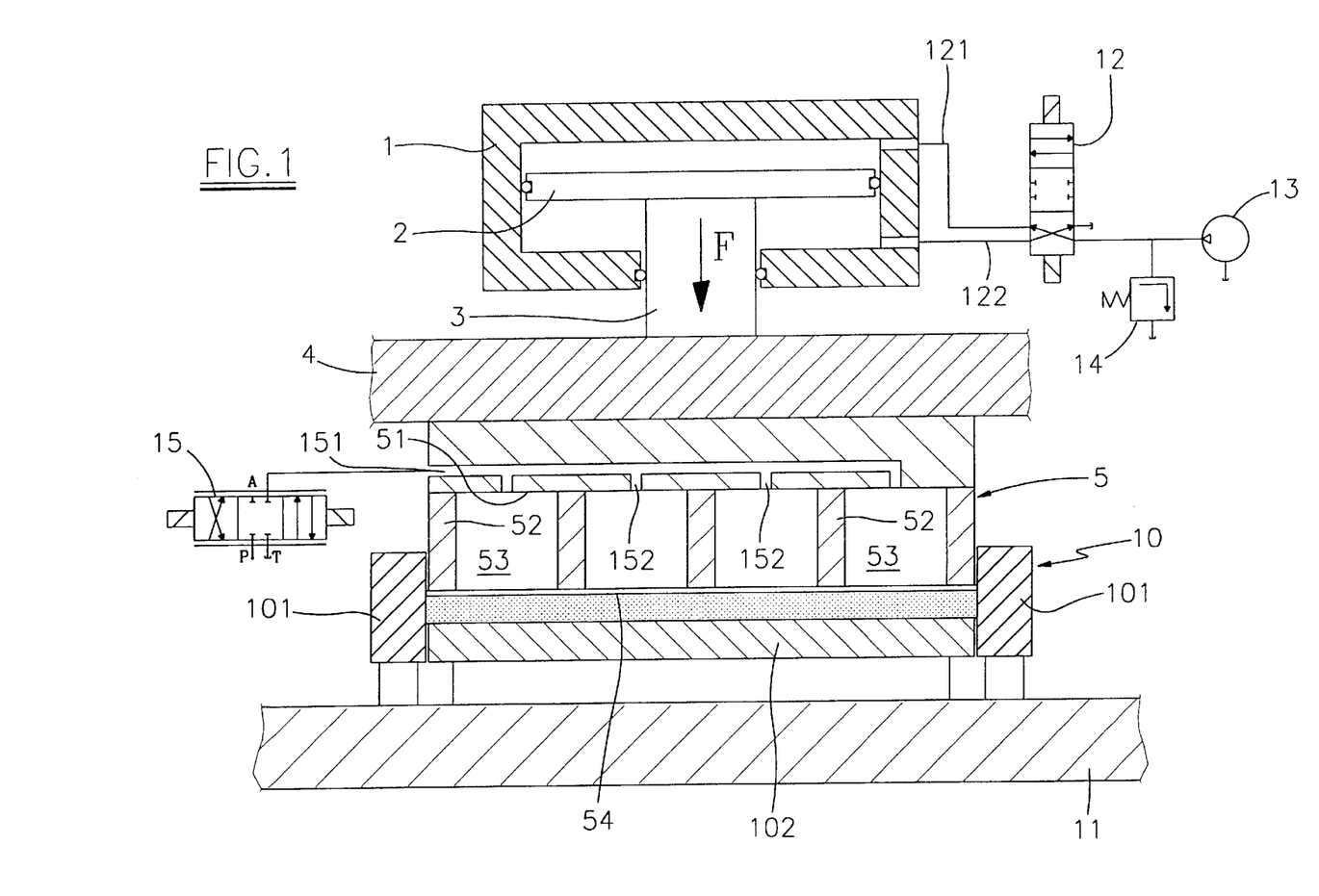
FIG. 1 is a schematic section through the first embodiment of a press with a relative mould according to the present invention, shown in a first operating position.

With the punch in this condition, a first pressing, a deaeration operation and a second pressing at a maximum press thrust are carried out.

Subsequently, maintaining the piston 2 descending with the distributor valve 12 positioned as in FIG. 1, a series of cycles is commenced by alternately pressurizing and depressurizing the cells 53 by operating the distributor valve 15.

During each of these cycles there is exerted on the piston 1 the sum of two reactions, namely that relative to the thrust on the powder of that membrane part rigid with the lattice 52 and that relative to that membrane part facing the cells 53.

As the thrust of that membrane part facing the cell 53 increases, that reaction relative to the membrane part rigid with the lattice 52 decreases until it becomes zero when the thrust relative to that membrane part facing the cells 53 equals the thrust exerted by the press by means of the piston 1, at which the cross-member and the piston 1 tend to rise.

Figure 2:
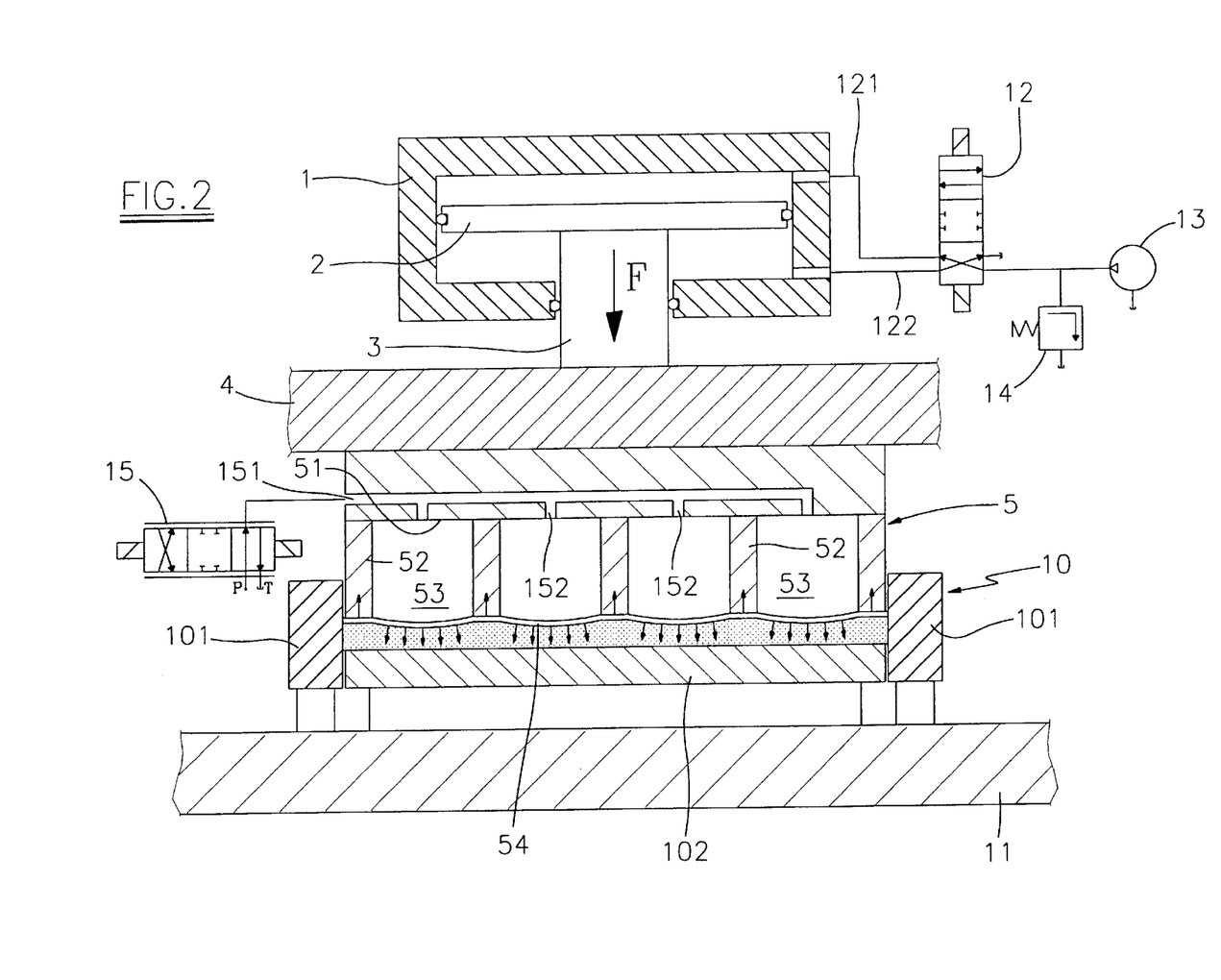
FIG. 2 shows the press of FIG. 1 in a second operating position.

This stage is shown in FIG. 2.

Figure 3:
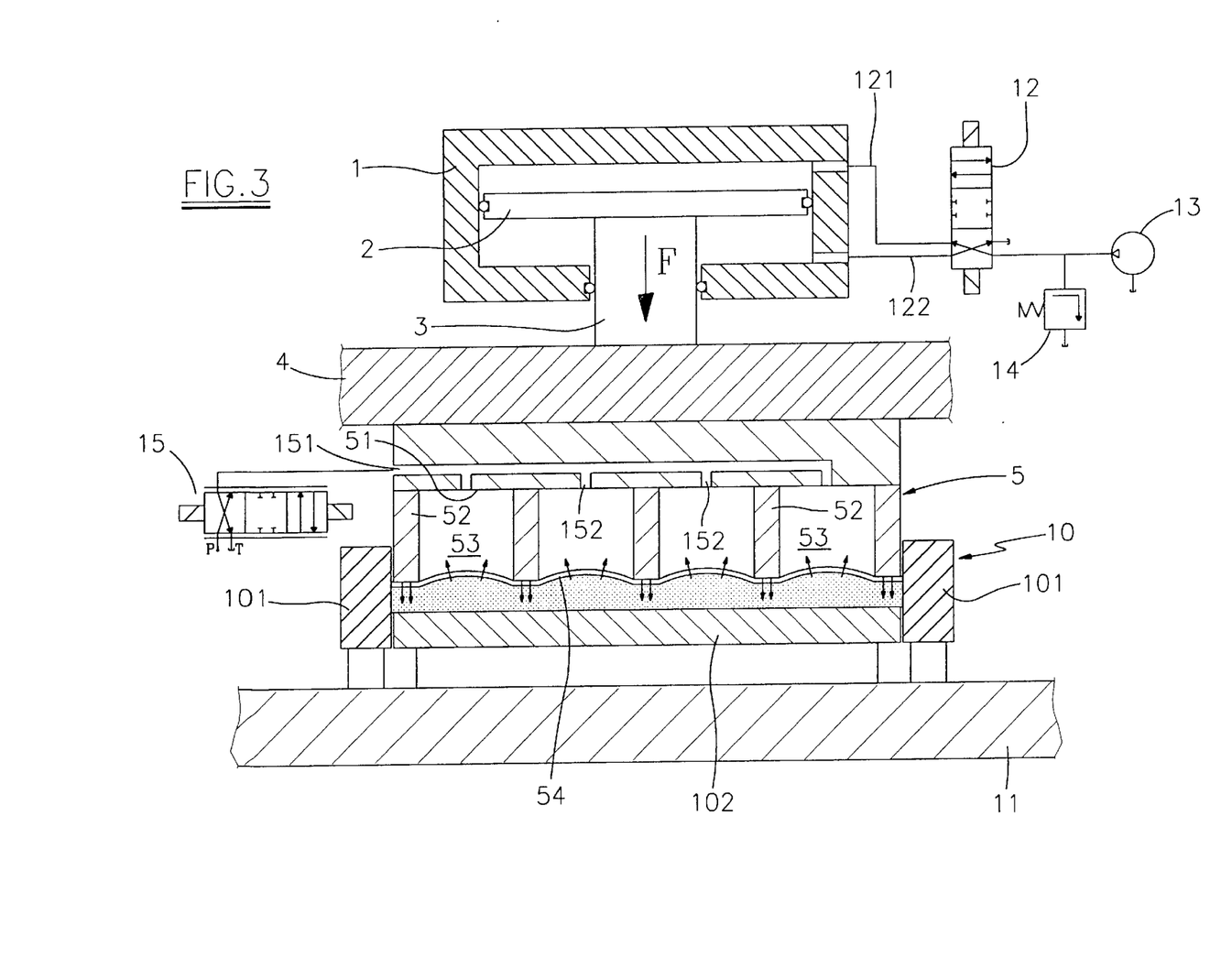
FIG. 3 shows the press of FIG. 1 in a third operating position.

At this point the command to the distributor valve 15 is reversed to discharge the oil contained in the cells 53, to achieve the situation shown in FIG. 3.

The procedure is conducted (ie the operating pressures are chosen) such that generally the two aforedefined membrane portions exert the same pressure on the entire surface area at the end of the pressing operation.

The final tile compacting pressure can be reached by partial pressure increments firstly on one membrane portion and then on the other.

Figure 4:
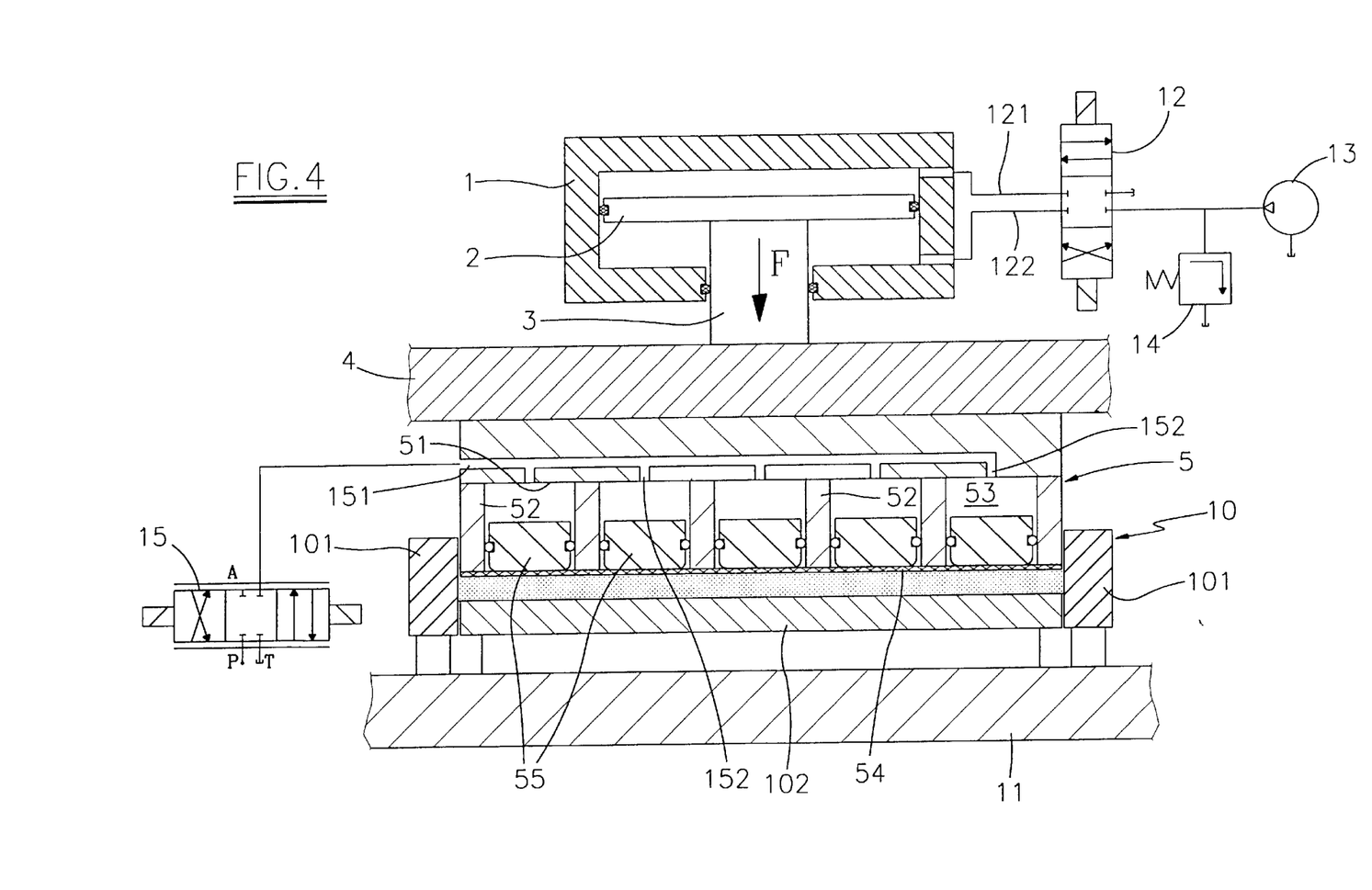
FIG. 4 is a schematic section through the a second embodiment of the present invention.

FIG. 4 shows a second embodiment in which the cells 53 are of quadrangular or rounded section, for example circular, and each contains a small hydraulic piston 55 which exerts its thrust on the powder not directly but via the elastic membrane 54 fixed onto S the pressing surface of the lattice. The operating cycle is similar to the aforedescribed.

The invention can have many possible modifications.

The press can press vertically from the top downwards or from the bottom upwards, or from the top and from the bottom if it has two presser pistons, namely upper and a lower pistons, or it can be a horizontal press.

The mould can be of the so-called mirror type in which the die is movable instead of a rigid, or can be of double-die type with inverse pressing, or can be of a reentering punch type.

In one of the possible modifications of the method and relative equipment for its implementation, having effected in the pressing cycle an initial pressing, deaeration and a second pressing at the maximum thrust value of the press as aforestated, oil is fed into the cells overlying the membrane in the form of rapid pressure pulses applied in succession as a pulsation, by making the distributor valve connected to the feed pipe of said cells oscillate between the pressure source and the discharge at a certain frequency, which can range for example from 1 to 50 Hz.

Figure 5:
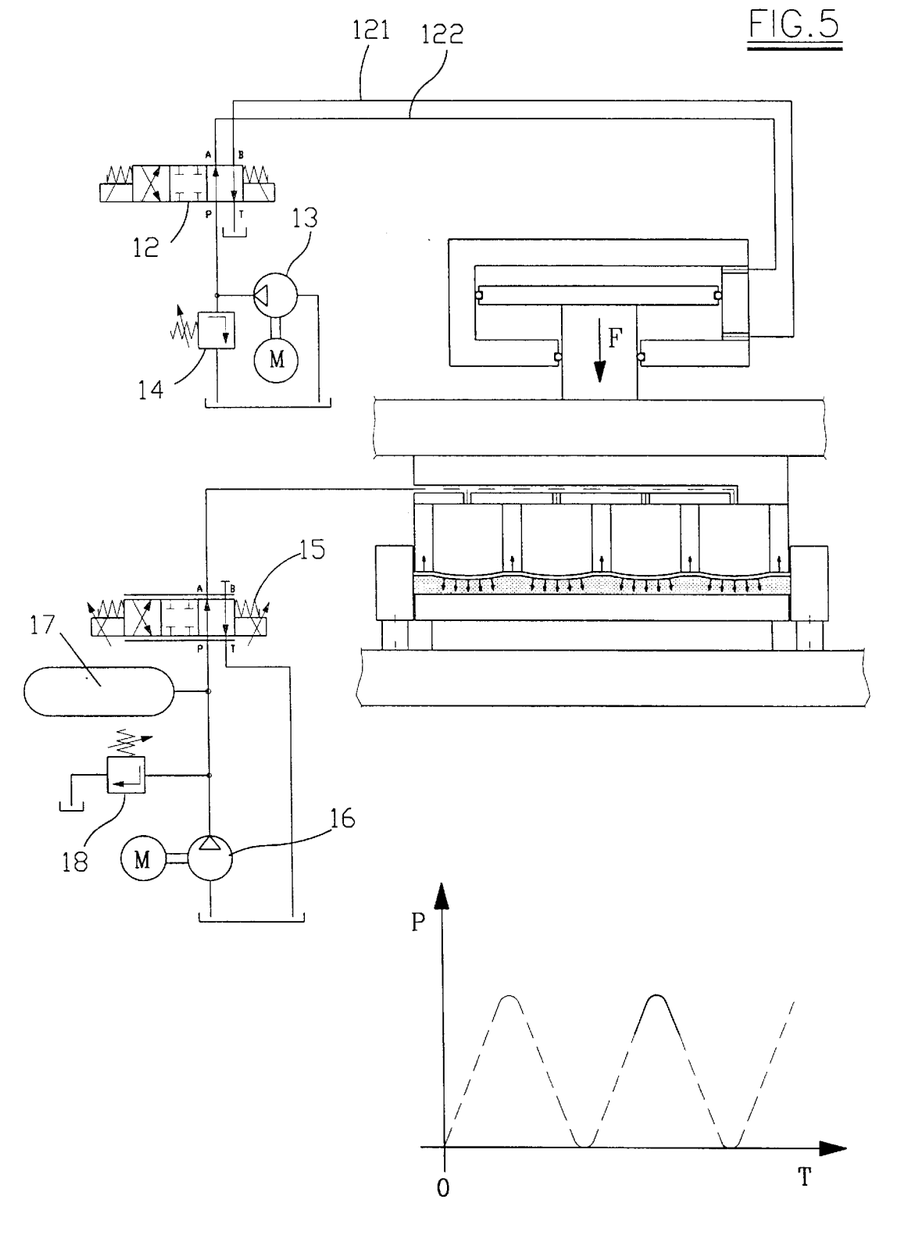
FIG. 5 is a schematic section through the third embodiment of a press with relative mould according to the invention, shown in a first operating position.
Figure 6:
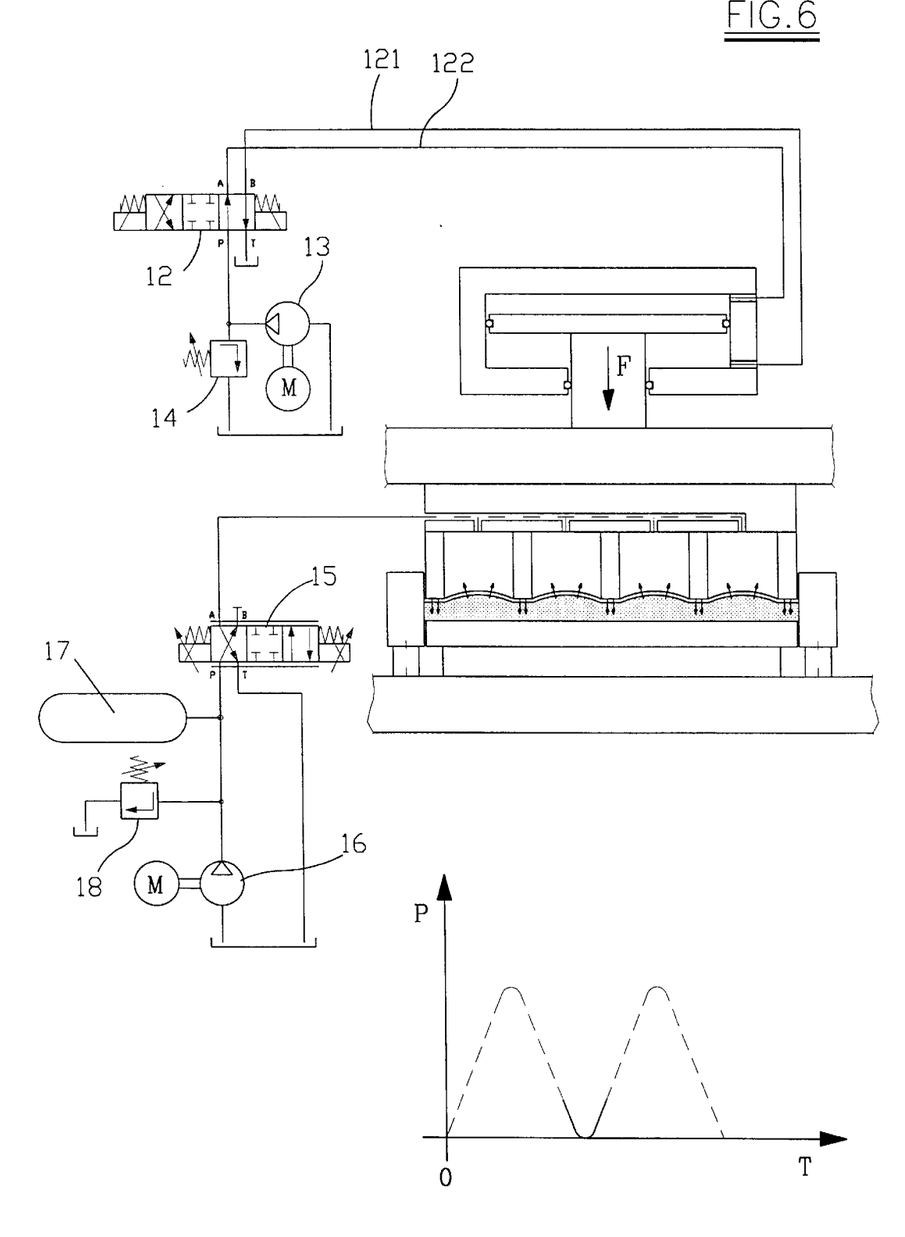
FIG. 6 shows the press of FIG. 5 in a second operating position.

FIGS. 5 and 6 show how to implement such a pressing procedure, which conceptually imitates the aforedescribed zonal compacting, but with a substantial difference, namely that the application within the cells 53 of close-together pressure pulses applied in succession in the manner of pulsation, increases the densifying effect on the underlying powder in the cells, it being possible to obtain the same density in the compacted powder regions below the membrane corresponding to the cells 53 by applying a substantially lower hydraulic pressure within the cells, for example of the order of one half the usual case.

The distributor valve 15 can be a servovalve which operates both as a normal distributor valve and as a hydraulic pulse generator, or can be a rotary distributor valve suitably operated by an actuator or an electric or hydraulic motor of adjustable speed and position.

FIGS. 5 and 6 show a schematic auxiliary circuit acting as a pressure source for the cells 53, consisting of a pump 16 connected to the distributor valve 15 via an accumulator 17 and a maximum pressure valve 18. The pressure source could be the same which feeds the main hydraulic piston 1, but using suitable pressure reducing valves (not shown) to achieve the desired pressure.

Figure 7:
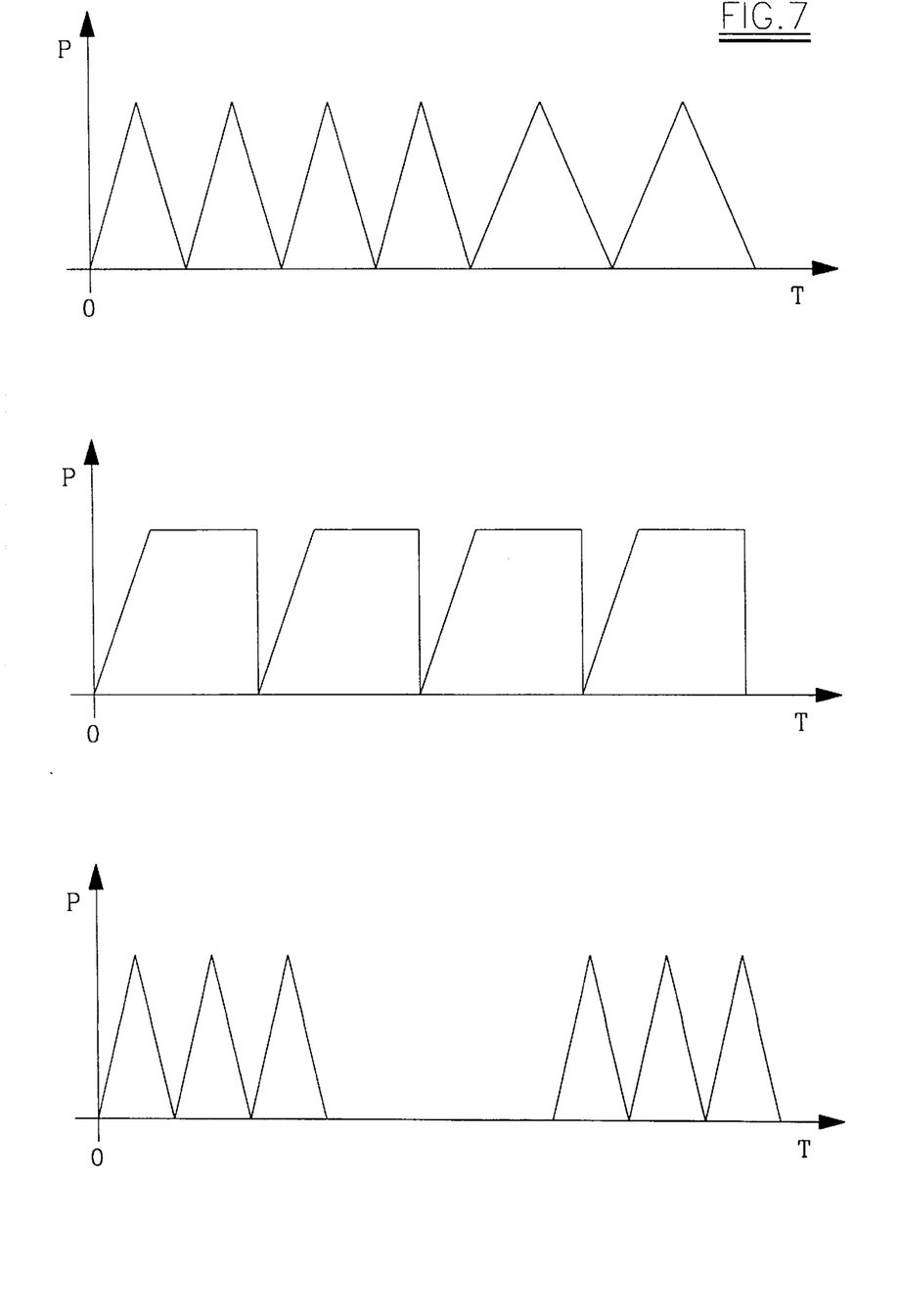
FIG. 7 shows diagrams of the pressure to which the powder in the mould of the press of FIGS. 5 and 6 is subjected.

The pulsating cycle can vary in terms of pulse frequency, number, intensity and pressure waveform, which can assume one of the forms shown in FIG. 7.

Figure 8:
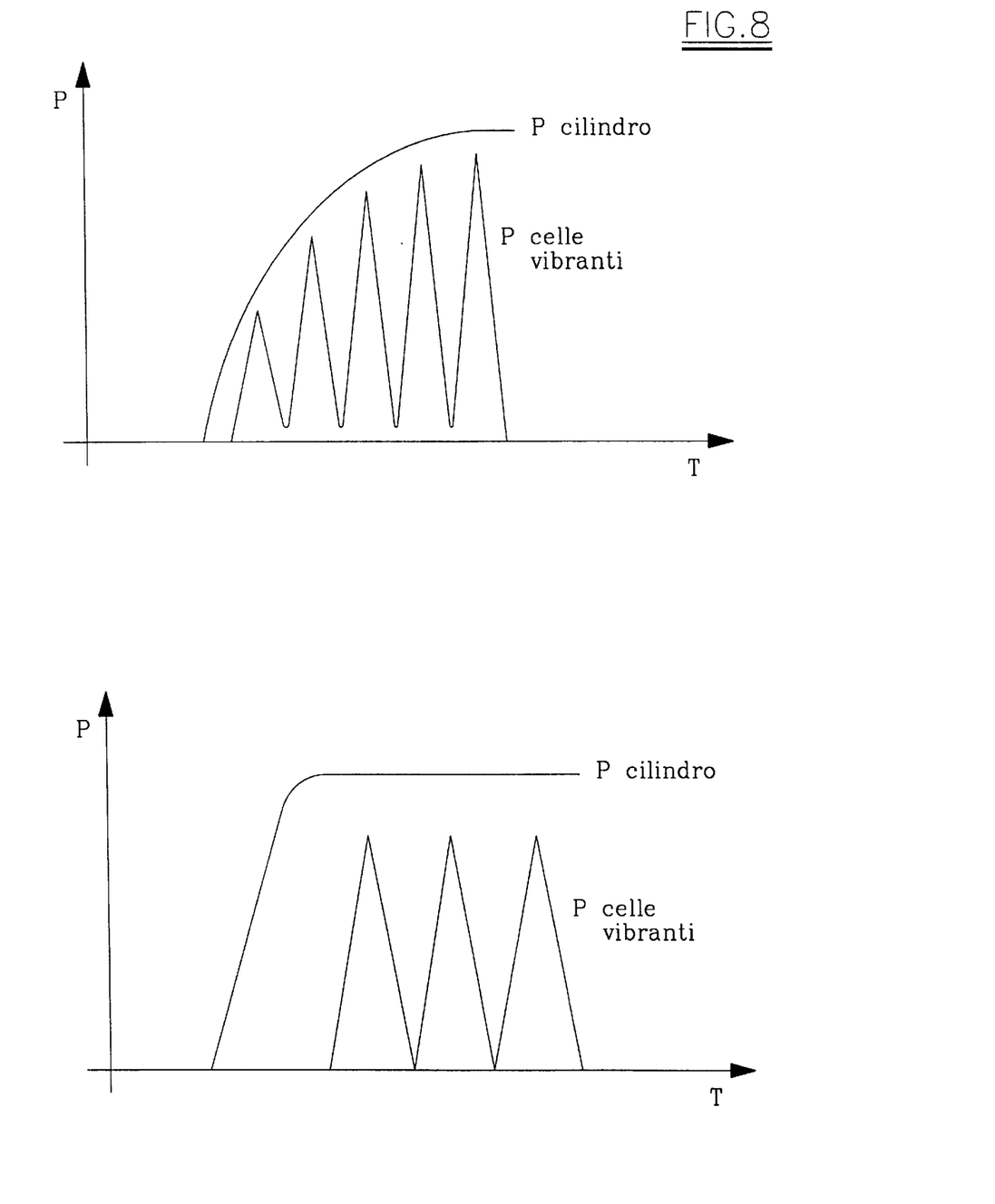
FIG. 8 shows diagrams of the pressure to which the main hydraulic cylinder is subjected and the pressure to which the cells of the mould of the press of FIGS. 5 and 6 are subjected.

Moreover, instead of applying the pulsation only during the last pressing stage, a pressure increasing towards the maximum value can be applied from the start of pressing, while at the same time gradually increasing the thrust on the movable cross-member until the maximum value is reached, as shown in FIG. 8.

Finally, ultrasound can be applied to the oil behind the membrane.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A plant for forming ceramic tiles, including ceramic tiles having large dimensions, said plant comprising:
   a bed;
   a ceramic mold supported on said bed;
   a fixed upper cross-member and a movable cross-member connected to said fixed cross-member by means of a double-acting hydraulic cylinder-piston unit;
   a punch supported by said movable cross-member;
   a source of pressurized hydraulic liquid connected to a cylinder of said cylinder-piston unit via a distributor valve; and
   a maximum pressure valve of adjustable setting, wherein said punch includes
   a cavity,
   a lattice positioned within said cavity and defining a plurality of cells,
   an elastic membrane securely fixed to edges of said cavity and of said lattice, said cells communicating with a single manifold connected to a pressurized oil source via a distributor valve arranged to connect said cavity alternately to said source and to a discharge of the distributor valve, and
   programmed means for operating said distributor valve.

2. The plant as claimed in claim 1, wherein a surface of an edge of the lattice to which the membrane is fixed has an area of the same order of magnitude as a total area of the elastic membrane facing the cells.

3. The plant as claimed in claim 1, wherein a slider of said distributor valve is operated by electromagnetic means.

4. The plant as claimed in claim 1, wherein said distributor valve is of a servovalve type having a slider, said slider is controlled by electromagnetic means programmed in such a manner as to generate close-together pressure pulses, in combination with said source of pressurized hydraulic liquid, said close-together pressure pulses are applied in succession as pulsations within the cells and consequently onto a surface of the membrane which closes said cells.

5. The plant as claimed in claim 1, wherein said distributor valve is of a rotary type suitably operated by an actuator or a motor of adjustable speed and position, said motor being either electric or hydraulic, and said distributor valve is operated in such a manner as to generate close-together pressure pulses, in combination with said source of pressurized hydraulic liquid, said close-together pressure pulses are applied in succession as pulsations within the cells and consequently onto a surface of the membrane which closes said cells.

6. The plant as claimed in claim 3, wherein means for generating hydraulic pulses within said cells and consisting of vibration sources positioned in contact with the pressurized hydraulic liquid is provided in combination with said distributor valve.

7. The plant as claimed in claim 6, wherein said means for generating hydraulic pluses are an ultrasound source in contact with the pressurized hydraulic liquid.

* * * * *